US000001484H

United States Statutory Invention Registration [19]

[11] Reg. Number: H1484

Collins

[43] Published: Sep. 5, 1995

[54] METHOD FOR OBTAINING POLYMER/BITUMEN BLENDS WITH IMPROVED STABILITY AND POLYMER EFFICIENCY

[75] Inventor: James H. Collins, Houston, Tex.

[73] Assignee: Shell Oil Company, Houston, Tex.

[21] Appl. No.: 160,005

[22] Filed: Nov. 30, 1993

[51] Int. Cl.[6] ..... C08L 95/00

[52] U.S. Cl. ..... 524/59; 524/68; 524/71; 106/281.1

[58] Field of Search ..... 524/59, 68, 71; 106/281.1

[56] References Cited

U.S. PATENT DOCUMENTS

| | | | |
|---|---|---|---|
| H876 | 1/1991 | Gilmore et al. | 524/68 |
| 4,145,322 | 3/1979 | Maldonado et al. | 260/28.5 AS |
| 4,330,449 | 5/1982 | Maldonado et al. | 524/68 |
| 4,412,019 | 10/1983 | Kraus | 524/71 |
| 4,503,176 | 3/1985 | Barlow et al. | 524/62 |
| 4,554,313 | 11/1985 | Hagenbach et al. | 525/54.5 |
| 4,567,222 | 1/1986 | Hagenbach et al. | 524/476 |
| 5,019,610 | 5/1991 | Sitz et al. | 524/59 |
| 5,078,905 | 1/1992 | Trinh et al. | 252/182.17 |
| 5,118,733 | 6/1992 | Gelles et al. | 524/68 |
| 5,120,777 | 6/1992 | Chaverot et al. | 524/62 |

FOREIGN PATENT DOCUMENTS

| | | |
|---|---|---|
| 0020203 | 12/1980 | European Pat. Off. . |
| 1611148 | 6/1987 | European Pat. Off. . |
| 0360656 | 3/1990 | European Pat. Off. . |
| 0384254 | 8/1990 | European Pat. Off. . |
| 0174795 | 10/1990 | European Pat. Off. . |
| 0467790 | 1/1992 | European Pat. Off. . |
| 3710405 | 10/1987 | Germany . |
| 3830679 | 9/1989 | Germany . |
| 2029417 | 1/1983 | United Kingdom . |
| 89/12079 | 12/1989 | WIPO . |

*Primary Examiner*—Donald P. Walsh
*Assistant Examiner*—Chrisman D. Carroll

[57] ABSTRACT

The present invention is an improvement in a process for producing a blend of bitumen and a block copolymer of a vinyl aromatic hydrocarbon and a conjugated diene comprising mixing from 88 to 99.5 weight percent of bitumen with 0.5 to 12 weight percent copolymer at 135° to 250° C., agitating the mixture for at least 30 minutes, adding 0.01 to 2 weight percent sulfur and maintaining the mixture under agitation for at least 30 minutes. The improvement comprises utilizing high shear mixing at a shear rate of at least 10,000 second$^{-1}$ to provide said agitation.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR OBTAINING POLYMER/BITUMEN BLENDS WITH IMPROVED STABILITY AND POLYMER EFFICIENCY

BACKGROUND OF THE INVENTION

The present invention relates to a process for blending block copolymers of vinyl aromatic hydrocarbons and conjugated dienes with bitumen and crosslinking them with sulfur. More particularly, the present invention relates to such a process which utilizes high shear mixing.

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrenebutadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

Such bitumen/block copolymer mixtures have been crosslinked with a crosslinking agent such as sulfur to provide improved mechanical properties. A number of methods for incorporating the sulfur have been used. One of these involves mixing the bitumen and the copolymer together and agitating them for a period of time before adding the sulfur. After the sulfur is added, the agitation is continued for a period of time. This method is advantageous but has the disadvantage that the resulting morphology is relatively coarse. A very fine dispersion of the polymer would provide better high temperature properties. Therefore, it would be advantageous to provide a process for producing such bitumen/block copolymer blends which have a stable and very fine morphology. The present invention provides such a process.

SUMMARY OF THE INVENTION

The present invention is an improvement in a process for producing a blend of bitumen and a block copolymer of a vinyl aromatic hydrocarbon and a conjugated diene which comprises mixing from 88 to 99.5 weight percent of bitumen with 0.5 to 12 weight percent of copolymer at 135° to 250° C., agitating the mixture for at least 30 minutes, adding 0.01 to 2 percent sulfur to the mixture and maintaining the mixture under agitation for at least 30 minutes. The improvement comprises utilizing high shear mixing at a shear rate of at least 10,000 second$^{-1}$ to provide the agitation.

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers is described in U.S. Patent Nos. 3,113,986, 4,226,952, and Reissue 27,145, the disclosures of which are herein incorporated by reference. The polymers used herein may be linear polymers, radial polymers having three or more arms, and they may also be star polymers having a plurality of arms. The arms referred to are block copolymers of vinyl aromatic hydrocarbons and conjugated dienes.

Conjugated dienes which may be utilized to prepare the polymers and copolymers include those having from 4 to 8 carbon atoms and also include 1,3-butadiene, 2-methyl-l,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 2,4-dimethylstyrene, alpha-methylstyrene, vinylnapthalene, vinylanthracene and the like. The preferred vinyl aromatic hydrocarbon is styrene.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The bitumen/block copolymer compositions of the present invention generally comprise from 88 to 99.5, preferably 92 to 99, weight percent asphalt and 0.5 to 12, preferably 1 to 8, weight percent block copolymer. Higher polymer concentrations provide good properties but are not cost effective. Lower polymer concentrations do not provide a continuous polymer network necessary for improved properties. These two materials are mixed together and then subjected to high shear mixing at 135° to 250° C. at a shear rate of at least 10,000 second$^{-1}$ for a period of at least 30 minutes in order to achieve a blend morphology characterized by a very fine, stable polymer distribution.

After the desired morphology is achieved, sulfur is added in an amount of 0.01 to 2 weight percent and the mixture is maintained under said high shear agitation for at least 30 minutes to achieve complete reaction of the sulfur. The irreversible crosslinking reaction stabilizes the dispersion achieved by the high shear mixing. The high shear rate specified above for the agitation of the bitumen/polymer blend is necessary to achieve the desired morphology and to assure a stable irreversible fine polymer distribution.

Shear rate is defined as the ratio of the speed of the moving part of the mixer or rotor to the gap between the moving part and stationary part or stator of the mixer. For example, a 3 foot diameter impeller rotating at 100 rpm with a clearance of ½ inch would provide a shear rate of about 400 second$^{-1}$. A Silverson L4R mixer with a diameter of 30 millimeters and a gap of approximately 0.1 millimeter rotating at 3000 rpm would provide a shear rate of about 50,000 second$^{-1}$. Shear rates suitable to this invention may be achieved on a laboratory scale with mixers manufactured by, for example, Silverson or Ross, and on a commercial scale with mixers manufactured by, for example, Siefer or Dalworth. A shear rate of at least 10,000 second$^{-1}$ is required to achieve the desired morphology of the invention.

EXAMPLE

Polymer and asphalt as specified below were mixed at 160° C. for 1 ½ hours using high or low shear mixing. For high shear mixing a Silverson L4R mixer operating at 4000 rpm (greater than 750,000 second$^{-1}$) was used. For low shear mixing an impeller low shear mixer operating at 1000 rpm (about 000 second$^{-1}$) was used. After complete mixing of the polymer, sulfur was added and mixed an additional hour. High shear mixing leads to significant increases in viscosity and ring and ball softening point. Composition and properties of the blends are listed in the Table.

| | A | B | C | D |
|---|---|---|---|---|
| Asphalt - AC5 phr[3] | 100 | 100 | 100 | 100 |
| Polymer | | | | |
| 1205[1] phr | 3 | 3 | | |
| KRATON ® D1101[2] phr | | | 3 | 3 |
| Sulfur phr | 0.13 | 0.13 | 0.13 | 0.13 |
| Shear rate | High | Low | High | Low |
| Penetration, decimillimeters | | | | |
| 25° C. | 99 | 99 | 92 | 92 |
| 4° C. | 41 | 41 | 38 | 38 |
| Viscosity | | | | |
| 60° C., poise | 2400 | 1900 | 24000 | 3000 |
| 135° C., centistokes | 600 | 460 | 670 | 570 |
| Ring & Ball Softening Point, F | 127 | 119 | 137 | 124 |

[1]a styrene-butadiene (SB) diblock copolymer
[2]a linear SBS block copolymer
[3]phr - parts by weight per 100 parts of rubber (the block copolymer)

I claim:

1. In a process for producing a blend of bitumen and a block copolymer of a vinyl aromatic hydrocarbon and a conjugated diene comprising mixing from 88 to 99.5 weight percent of bitumen with 0.5 to 12 weight percent copolymer at 135° to 250° C., agitating the mixture for at least 30 minutes, adding 0.01 to 2 weight percent sulfur and maintaining the mixture under agitation for at least 30 minutes, the improvement which comprises utilizing high shear mixing at a shear rate of at least 10,000 second$^{-1}$ to provide said agitation.

2. The product of the process of claim 1.

3. The process of claim 1 wherein the bitumen concentration is 92 to 99 weight percent and the polymer concentration is 1 to 8 weight percent.

4. The product of the process of claim 3.

* * * * *